(12) United States Patent
Lee et al.

(10) Patent No.: US 8,977,397 B2
(45) Date of Patent: Mar. 10, 2015

(54) METHOD FOR CONTROLLING GAIT OF ROBOT

(71) Applicant: Hyundai Motor Company, Seoul (KR)

(72) Inventors: Seok Won Lee, Nonsan-si (KR); Woo Sung Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 167 days.

(21) Appl. No.: 13/844,670

(22) Filed: Mar. 15, 2013

(65) Prior Publication Data

US 2014/0188279 A1 Jul. 3, 2014

(30) Foreign Application Priority Data

Dec. 27, 2012 (KR) ........................ 10-2012-0154468

(51) Int. Cl.
| | | |
|---|---|---|
| *G05B 15/00* | (2006.01) | |
| *B25J 9/16* | (2006.01) | |
| *B62D 57/032* | (2006.01) | |
| *G05D 9/00* | (2006.01) | |

(52) U.S. Cl.
CPC ............. *B25J 9/1607* (2013.01); *B62D 57/032* (2013.01); *Y10S 901/01* (2013.01)
USPC ................ 700/258; 700/250; 700/252; 901/1

(58) Field of Classification Search
None
See application file for complete search history.

(56) References Cited

U.S. PATENT DOCUMENTS

| | | | | |
|---|---|---|---|---|
| 7,386,366 B2* | 6/2008 | Dariush | ........................ | 700/245 |
| 7,684,896 B2* | 3/2010 | Dariush | ........................ | 700/245 |
| 2010/0324699 A1* | 12/2010 | Herr et al. | ........................ | 623/27 |
| 2011/0082566 A1* | 4/2011 | Herr et al. | ........................ | 623/24 |
| 2013/0312483 A1* | 11/2013 | Herr et al. | ........................ | 73/1.38 |
| 2014/0081424 A1* | 3/2014 | Herr et al. | ........................ | 623/50 |
| 2014/0088729 A1* | 3/2014 | Herr et al. | ........................ | 623/50 |
| 2014/0277739 A1* | 9/2014 | Kornbluh et al. | ............. | 700/260 |

FOREIGN PATENT DOCUMENTS

| | | |
|---|---|---|
| JP | 2000-166997 A | 6/2000 |
| JP | 2006-334200 A | 12/2006 |
| JP | 2008-073830 A | 4/2008 |
| KR | 10-1999-0059516 A | 7/1999 |
| KR | 100810004 B1 | 3/2008 |
| KR | 10-2010-0082989 A | 7/2010 |
| KR | 10-2012-0121958 A | 11/2012 |

OTHER PUBLICATIONS

Korean Office Action issued in Korean Application No. 10-2012-0154468 on Dec. 11, 2013, 4 pgs.

* cited by examiner

*Primary Examiner* — Ian Jen
(74) *Attorney, Agent, or Firm* — McDermott Will & Emery LLP

(57) ABSTRACT

A method includes: forming an imaginary wall at a position spaced apart and outward from feet of the robot when the robot is in a double-leg-support state; kinetically calculating a variation in a distance between a body of the robot and the imaginary wall and a variation in a speed of the body of the robot relative to the imaginary wall using an angle of a joint and lengths of links of the robot; applying the variation in the distance and the variation in the speed to an imaginary spring-damper model formed between the body of the robot and the imaginary wall, and calculating an imaginary reaction force required by the body of the robot; and converting the calculated reaction force into a drive torque required by the body of the robot using a Jacobian transposed matrix.

8 Claims, 7 Drawing Sheets

METHOD FOR CONTROLLING GAIT OF ROBOT

CROSS REFERENCE TO RELATED APPLICATIONS

This application claims the benefit of Korean Application No. 10-2012-0154468, entitled "Method for Controlling Gait of Robot" filed on Dec. 27, 2012, which is hereby incorporated by reference in its entirety.

BACKGROUND OF THE DISCLOSURE

1. Field of the Disclosure

The present disclosure relates to a method for controlling the gait of a wearable robot using an imaginary suspension to make the robot more reliable for a wearer who wears the robot on his/her lower extremity to walk with the robot.

2. Description of the Related Art

A variety of conventional control methods have been proposed to control the gait of walking or wearable robots.

In such conventional methods of controlling the gait of a robot, it is comparatively easy to control the robot to walk along a preset path, but it is difficult to keep the robot balanced when it is walking or standing in one place. Particularly, when the robot is wobbled by an external force, it is very difficult to quickly control the robot and to keep its balance.

An example of the conventional technique was proposed in Korean Patent Laid-open Publication No. 10-2012-0121958 A, entitled "FORCE/TORQUE SENSOR FOR ROBOT AND METHOD OF CONTROLLING GAIT OF ROBOT USING THE SAME." The method of this conventional technique includes the steps of: measuring a vertical rotating torque, generated when the robot is walking, using force/torque sensors provided on the legs of the robot; and controlling a joint of an upper body of the robot in response to the measured rotating torque and adjusting a load applied to the legs of the robot. However, this conventional technique can not markedly improve keeping the robot balanced when it is walking or standing in one place.

Another example was proposed in Korean Patent Laid-open Publication No. 10-1999-0059516 A, entitle "METHOD AND APPARATUS FOR CONTROLLING ROBOT MANIPULATOR." This conventional technique relates to a method and apparatus for controlling a robot manipulator to improve the operational performance of the robot around a singular point. Specifically, the method and apparatus determines a singular point of the manipulator, calculates a control input value depending on a relative size of the singular point using a Jacobian transposed matrix corresponding to a current position value of the manipulator, and controls the manipulator depending on the control input value. The control method of this conventional technique can reliably operate the manipulator of the robot at or around a singular point It should be understood that the foregoing description is provided to merely aid the understanding of the present disclosure, and does not mean that the present disclosure falls under the purview of the related art.

(Patent document 1) KR10-2012-0121958 A
(Patent document 2) KR10-1999-0059516 A

SUMMARY OF THE DISCLOSURE

An object of the present disclosure is to provide a method for controlling the gait of a wearable robot using an imaginary suspension to make the robot more reliable.

In order to accomplish the above object, the present disclosure provides a method for controlling gait of a robot, including: forming an imaginary wall at a position spaced apart and outward from feet of the robot when the robot is in a double-leg-support state; kinetically calculating a variation in a distance between a body of the robot and the imaginary wall and a variation in a speed of the body of the robot relative to the imaginary wall using an angle of a joint and lengths of links of the robot; applying the variation in the distance and the variation in the speed to an imaginary spring-damper model formed between the body of the robot and the imaginary wall, and calculating an imaginary reaction force required by the body of the robot; and converting the calculated reaction force into a drive torque required by the body of the robot using a Jacobian transposed matrix.

The imaginary wall may comprise imaginary walls respectively formed on opposite sides of the robot, and ahead of and behind the robot.

The robot may include an ankle joint, a knee joint and a hip joint.

Converting the calculated reaction force may include, when the robot is in a single-leg-support state, kinetically calculating a variation in a height between a hip of the robot and a sole of one of the feet of the leg that is supporting the body, and kinetically calculating a variation in a speed of the hip relative to the sole using an angle of the joint and the lengths of the links of the robot.

Kinetically calculating the variation in the height may include applying the variation in the height and the variation in the speed of the hip to an imaginary spring-damper model that is present between the hip and the sole, and calculating an imaginary support force required by the leg that is supporting the body of the robot.

Calculating the imaginary support force may include converting the calculated support force into a drive torque required by the joint of the robot using a Jacobian transposed matrix.

The robot may include a pitching joint provided in a hip of the robot, and converting the calculated reaction force may include applying a variation in an angle of the pitching joint and a variation in an angular speed of the pitching joint to an imaginary spring-damper model that is present between two links that are connected to each other by the pitching joint, and calculating a pitching torque required by the pitching joint.

The robot may include a rolling joint provided in a hip of the robot, and converting the calculated reaction force may include applying a variation in an angle of the rolling joint and a variation in an angular speed of the rolling joint to an imaginary spring-damper model that is present between two links that are connected to each other by the rolling joint, and calculating a rolling torque required by the rolling joint.

As described above, in a method for controlling the gait of a robot, a suspension controller for imaginary spring-damper models which are provided orthogonally in a joint coordinate system functions to maintain an initial posture of a wearer in response to the appearance of the wearer In addition, when a force intended by the wearer or an external force is applied to the robot, the suspension controller can also function to dissipate, react to or recover the force.

Even when the robot is in the single-leg-support state, these functions are significantly used to maintain a stable state of the robot. When the robot transitions from the double-leg-support state to the single-leg-support state, a dynamic equation model momentarily varies due to a gravitational change and a change in a part which supports the robot body. At this time, the above-mentioned functions can prevent a rapid dynamic characteristics change and reduce a movement error which may be caused by a difference between an actual model and a dynamic equation modeling variable.

The state of the robot is periodically changed between the single-leg-support state and the double-leg-support state when the robot is walking. Here, when the robot takes a step on the ground and enters the single-leg-support state, a comparatively large external force is momentarily applied to the robot. The imaginary rotary suspensions which are provided on, e.g., three pitching axes can function to block a large impulse which is momentarily applied to the robot, thus absorbing shock. Restoring force by which the suspensions are returned to their original states assists the wearer in returning to his/her initial posture, thus reducing energy consumption of the wearer.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Hereinafter, a method for controlling the gait of a robot according to a preferred embodiment of the present disclosure will be described in detail with reference to the attached drawings.

Figure 1:
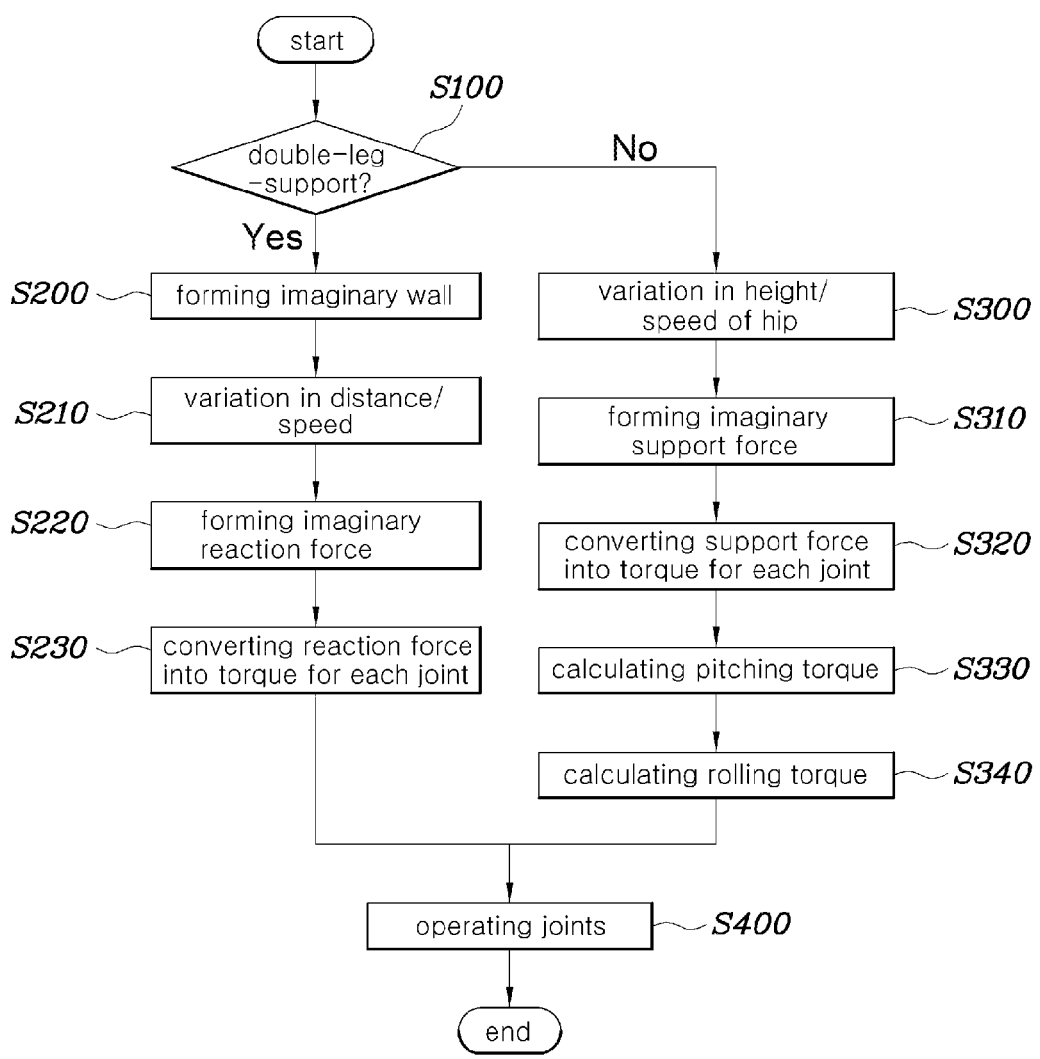
FIG. 1 is a flowchart of a method for controlling the gait of a robot, according to an exemplary embodiment of the present disclosure.
Figure 2:
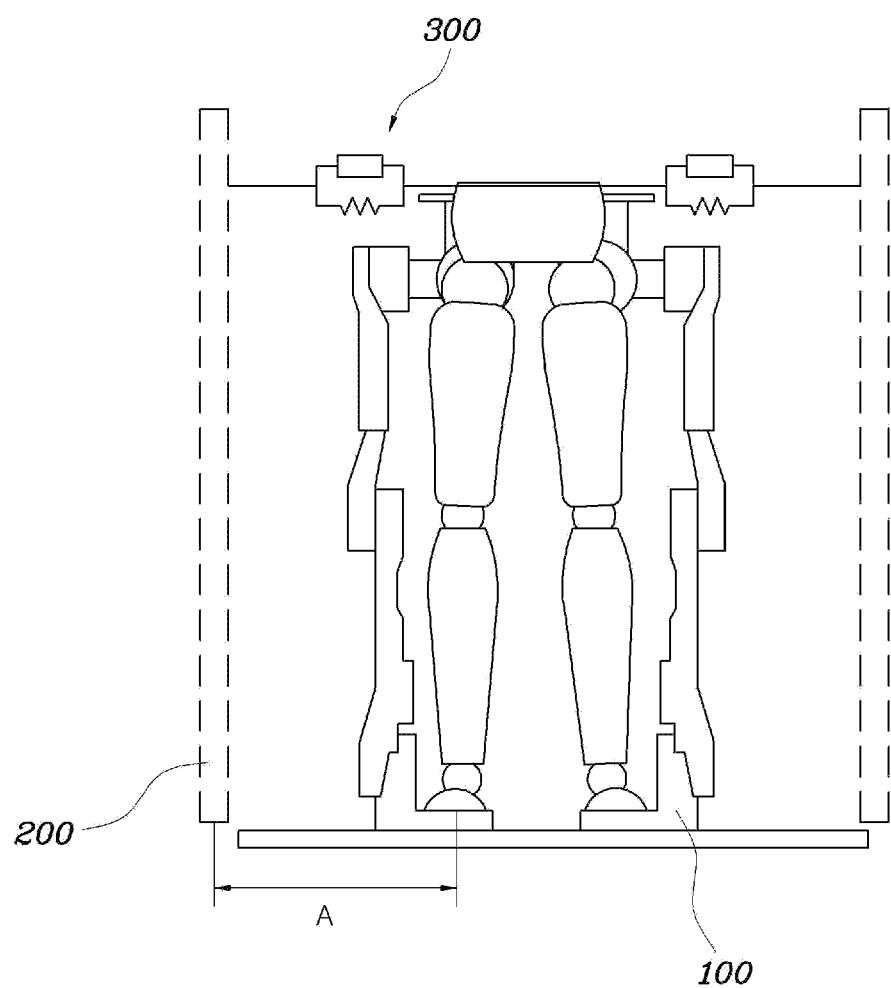
FIGS. 2 and 3 are views illustrating a double-leg-support state of the robot in the robot gait control method according to an exemplary embodiment of the present disclosure.
Figure 3:
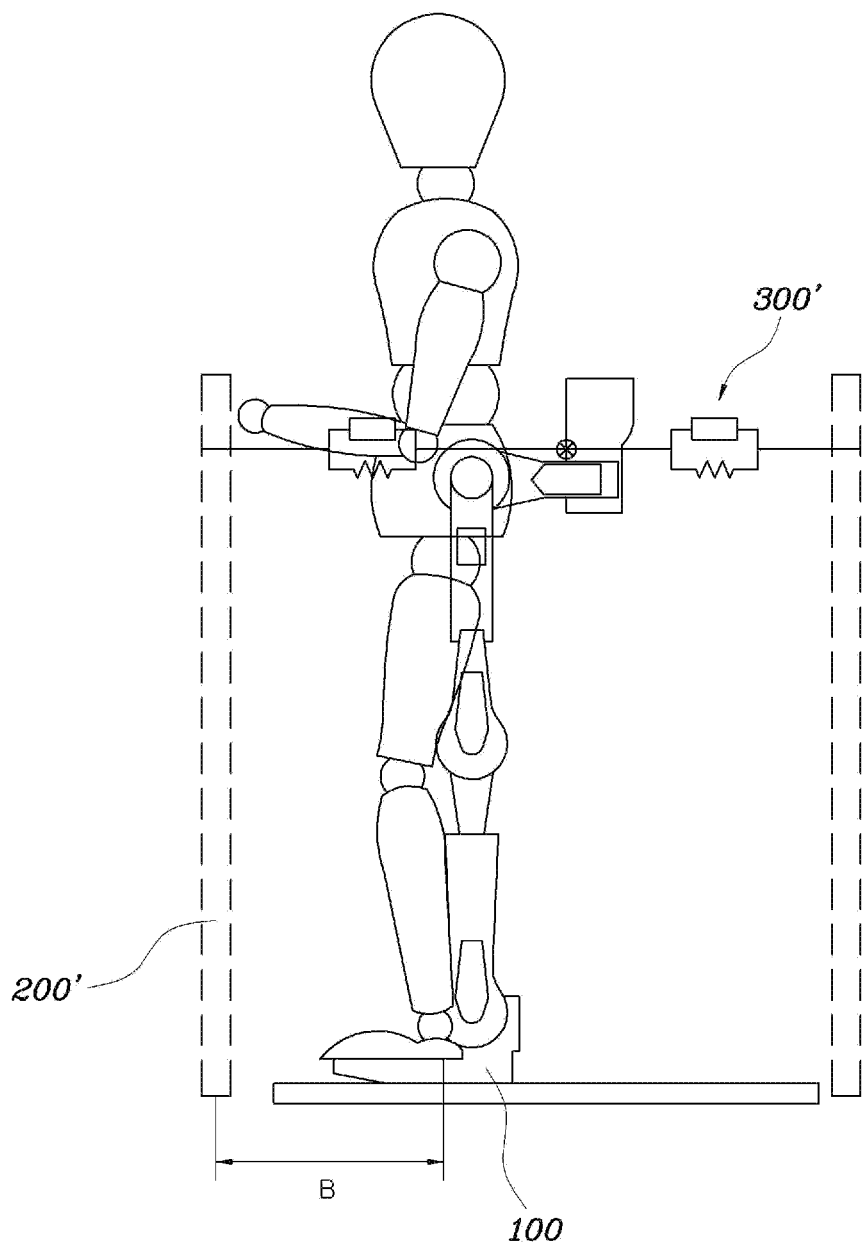
Figure 4:
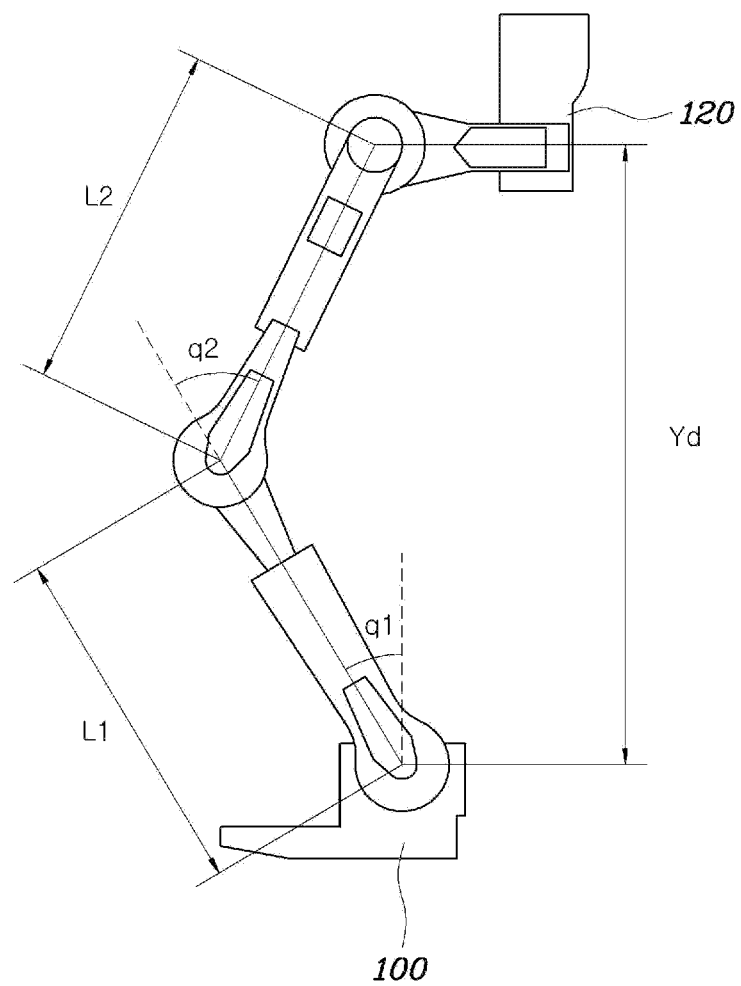
FIG. 4 is a view illustrating a kinetic calculation of the robot gait control method according to an exemplary embodiment of the present disclosure.
Figure 5:
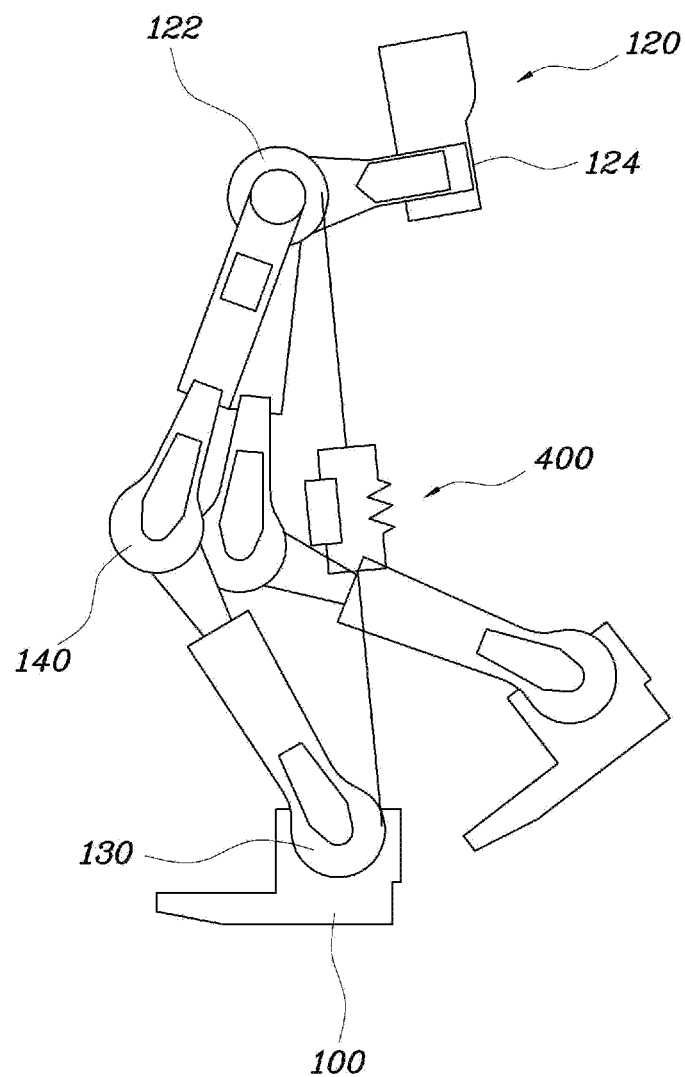
FIGS. 5 through 7 are views illustrating a single-leg-support state of the robot in the robot gait control method according to an exemplary embodiment of the present disclosure.
Figure 6:
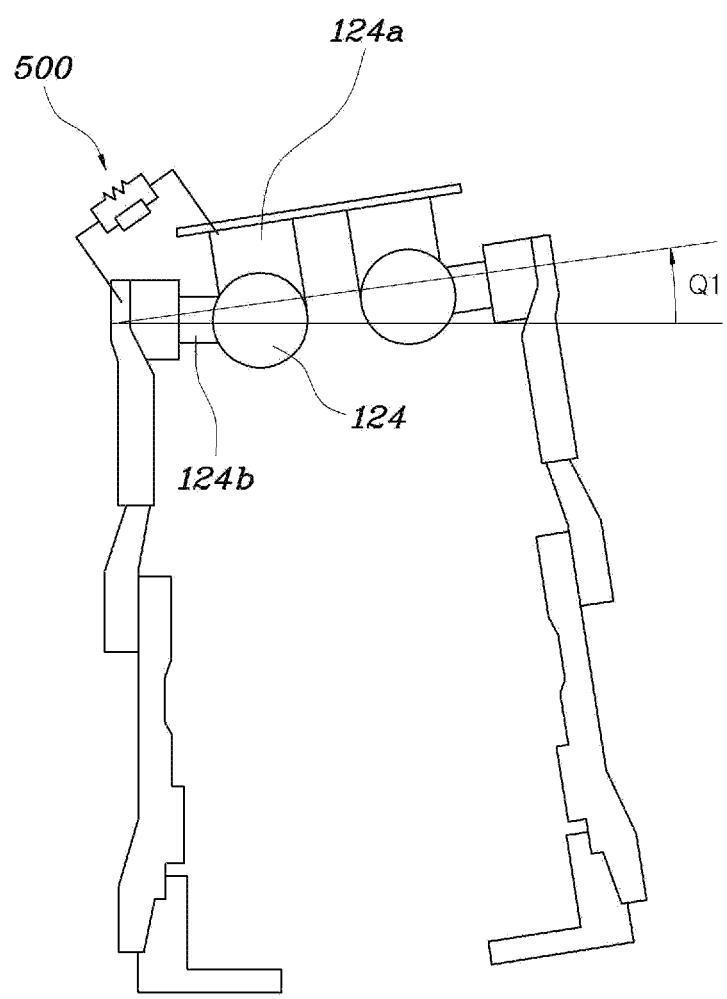
Figure 7:
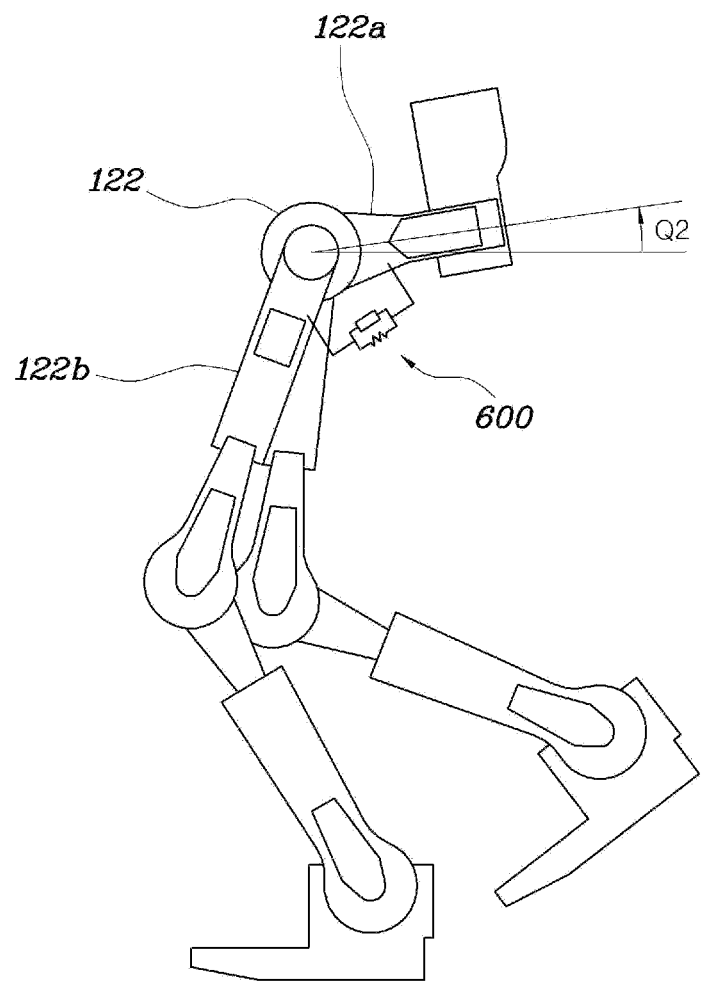

FIG. 1 is a flowchart of the robot gait control method according to an exemplary embodiment of the present disclosure. FIGS. 2 and 3 are views illustrating a double-leg-support state of the robot in the robot gait control method. FIG. 4 is a view illustrating a kinetic calculation of the robot gait control method. FIGS. 5 through 7 illustrate a single-leg-support state of the robot in the robot gait control method.

The present disclosure relates to a robot gait control method which can use an imaginary suspension system for controlling the gait of, e.g., a wearable lower extremity exoskeleton robot.

An exemplary robot gait control method of the present disclosure includes: an imaginary wall forming step S200 of forming imaginary walls at positions spaced apart and outward from the feet of the robot by predetermined distances when the robot is in a double-leg-support state; a variation calculation step S210 of kinetically calculating a variation in a distance between a body of the robot and each imaginary wall and a variation in a speed of the body of the robot relative to each imaginary wall using angles of joints and the lengths of links of the robot; a reaction force calculation step S220 of applying the distance variation and the speed variation to an imaginary spring-damper model which is formed between the robot body and each imaginary wall and calculating an imaginary reaction force required by the robot body; and a reaction force conversion step S230 of converting the calculated reaction force into a drive torque required by joints of the robot using a Jacobian transposed matrix.

Robots are classified into an unmanned robot which acts autonomously, and a wearable robot which a person wears to walk with. Although the present disclosure can be applied to both kinds of robots, a wearable robot to will be described in the following exemplary embodiment.

The present disclosure is devised such that a person wears a robot to walk with. To provide reliability of the gait of the robot, the present disclosure can separately control a double-leg-support state of the robot (i.e., a standing state), and a single-leg-support state (i.e., a walking state). Furthermore, even when the feet are being brought into contact with the ground while walking, control for the double-leg-support state can be carried out.

FIGS. 2 and 3 are views illustrating the double-leg-support state of the robot in the robot gait control method according to an exemplary embodiment of the present disclosure.

At step S100, it is determined whether the robot is in the double-leg-support state or the single-leg-support state. If the robot is in the double-leg-support state, the imaginary wall forming step S200 of forming the imaginary walls 200 and 200' spaced apart and outward from the feet by predetermined distances is first carried out.

After the imaginary walls 200 and 200' have been formed, suspensions including the spring-damper models 300 and 300' are formed between the imaginary walls and the robot. Supposing the suspensions apply a reaction force to the robot, the robot is controlled in such a way that the reaction force is provided to a joint drive system of the robot so that, when the robot leans in one direction, the robot reacts as if the suspensions absorb shock or the robot bouncing, whereby the robot can automatically keep its balance.

For this purpose, the imaginary walls are first formed. The imaginary walls are formed at positions spaced apart from corresponding soles 100 of the feet of the robot by predetermined distances. That is, as shown in FIG. 2, sidewalls are formed on opposite sides of the soles of the feet at positions spaced apart from the corresponding sole by a distance A. As shown in FIG. 3, front and rear walls are also formed ahead of and behind the soles of the feet, respectively, at positions spaced apart therefrom by a distance B.

The robot includes joints, and links which connect the joints to each other. At the variation calculation step S210, a variation in the distance between the robot body and each imaginary wall and a variation in the speed of the robot body relative to each imaginary wall are kinetically calculated using angles of the joints and lengths of the links of the robot. Therefore, if rotation angles of the joints are measured by encoders, a variation in the distance between a predetermined portion of the robot body and each imaginary wall can be kinetically calculated.

Because the locations of the imaginary walls are determined based on the soles of the feet of the robot, the locations of the imaginary walls can be regarded as being fixed relative to the robot. In this way, the location of the imaginary walls can be easily determined. Further, the location of the robot body can be kinetically determined using a trigonometric function based on the soles of the feet of the robot. Thus, variation in the relative distance between each imaginary wall and the robot body can be easily determined. Moreover, variation in the speed of the robot body can be obtained by a differential of the distance variation.

At the reaction force calculation step S220, the distance variation and the speed variation are applied to the imaginary spring-damper model, which is present between the robot body and each imaginary wall, so as to calculate an imaginary reaction force required by the robot body. As shown in FIGS. 2 and 3, an imaginary spring/damper 300 and 300', respectively, is provided between each corresponding imaginary wall and the robot body. The distance variation and the speed variation are applied to each imaginary spring-damper model, whereby a reaction force applied to the robot body can be obtained.

A sample equation can be derived from the following concept.

$$F=k\Delta x+c\Delta \dot{x}$$

$$\tau=J^T \cdot F \quad \text{[Equation 1]}$$

In Equation 1, k and c respectively denote a spring constant and a damping coefficient. At the reaction force conversion step S230, the calculated reaction force is converted by the Jacobian transposed matrix into a drive torque required by the joints of the robot. That is, a reaction force applied to an end of the robot body is converted by the Jacobian transposed matrix into a required drive torque for the joints, and is used to control the motors of the joints at step S400. Thereby, the robot can be controlled as if the robot is actually supported by the suspensions 300 and 300' on the imaginary walls 200 and 200', respectively.

Furthermore, the imaginary walls are respectively formed on opposite sides of the robot (200) and ahead of and behind the robot (200') so that the robot can be supported by the suspensions forwards, backwards, leftwards and rightwards, whereby when the robot is in the double-leg-support state, it can be automatically maintained in a stable posture, thus promoting the safety of the wearer.

Further, the robot may include ankle joints, knee joints and hip joints. Reaction forces are distributed and input as a drive torque into the corresponding joints.

FIG. 4 is a view illustrating a kinetic calculation of the robot gait control method according to an exemplary embodiment of the present disclosure. FIGS. 5 through 7 illustrate a single-leg-support state of the robot in the robot gait control method according to an exemplary embodiment of the present disclosure.

When the robot is in the single-leg-support state, it is walking. To keep the robot balanced, at least one of the legs of the robot which supports the robot body is intensively controlled.

Each leg may include an ankle joint 130, a knee joint 140 and a hip joint 120. The hip joint 120 may include a pitching joint 122 and a rolling joint 124 such that the hip can rotate around two axes and thus smoothly move in the same manner as that of the waist of a human being.

In the single-leg-support state of the robot, at a height calculation step S300, a variation in a height Yd between the sole 100 of the foot of the leg that is supporting the robot body and the corresponding hip joint 120, and a variation in a speed of the hip joint 120 relative to the sole 100, are both kinetically calculated using angles (e.g., q1 and q2) of the joints and the lengths (e.g., L1 and L2) of the links of the robot. At a support force calculation step S310, the height variation and the speed variation are applied to an imaginary spring-damper model which is present between the hip joint and the sole, thereby calculating an imaginary support force required by the support leg. After the support force calculation step S310, the calculated support force is converted, using the Jacobian transposed matrix, into a drive torque required by the joints of the robot at a support force conversion step S320.

The distance between the hip of the robot and the sole of the corresponding foot or the ground can be obtained by kinetic analysis, as shown in FIG. 4. That is, the distance can be kinetically calculated by the following equation using angles of the joints and the lengths of the links of the leg of the robot.

$$Yd=L1\cdot \cos(q1)+L2\cdot \cos(q2-q1) \quad \text{[Equation 2]}$$

After the height of the hip of the robot has been obtained, an imaginary spring-damper model is formed between the hip of the robot and the ground or the sole of the foot, and then an imaginary support force with which the hip is supported is calculated by a variation in height of the hip and a variation in speed of a movement of the hip. The support force is converted by the Jacobian transposed matrix into a required torque for each joint. The joints are operated by the corresponding torque such that the joints of the leg that is supporting the robot body can absorb a shock when the robot is walking.

The robot includes the pitching joint 122 which is provided in the hip. The reaction force conversion step s320 includes a pitching calculation step S330. In the pitching calculation step s330, a variation in an angle (Q2) of the pitching joint 122 and a variation in an angular speed of the pitching joint 122 are applied to an imaginary spring-damper model 600 which is present between two links 122a and 122b that are connected to each other by the pitching joint 122, and a pitching torque required by the pitching joint is calculated.

Furthermore, the robot includes the rolling joint 124 which is provided in the hip. The reaction force conversion step s320 further includes a rolling calculation step S340. In the rolling calculation step S340, a variation in an angle (Q1) of the rolling joint 124 and a variation in an angular speed of the rolling joint 124 are applied to an imaginary spring-damper model 500 which is present between two links 124a and 124b that are connected to each other by the rolling joint 124, and a rolling torque required by the rolling joint is calculated.

FIGS. 5 through 7 are views illustrating the single-leg-support state of the robot in the robot gait control method according to an exemplary embodiment of the present disclosure. The rolling torque and the pitching torque can be respectively expressed by the following equations.

$$\tau_{roll,recovery}=k\Delta q+c\Delta \dot{q}$$

$$\tau_{pitch,recovery}=k\Delta q+c\Delta \dot{q} \quad \text{[Equation 3]}$$

In an exemplary embodiment, the variation in an angle of each joint and the variation in an angular speed of the joint can be deduced and calculated by a rotary encoder or the like. These deduced variations are applied to a suspension model to calculate a drive torque required by the corresponding joint, whereby even when pitching or rolling, the joint can be restored in the same manner as that of a spring and be reliably operated by a damper.

As described above, in a method for controlling the gait of a robot, a suspension controller for imaginary spring-damper models which can be provided orthogonally in a joint coordinate system functions to maintain an initial posture of a wearer in response to the appearance of the wearer. In addition, when a force intended by the wearer or an external force is applied to the robot, the suspension controller can also function to dissipate, react to or recover the force.

Even when the robot is in the single-leg-support state, these functions are significantly used to maintain a stable state of the robot. When the robot transitions from the double-leg-support state to the single-leg-support state, a dynamic equation model momentarily varies due to a gravitational change and a change in a part which supports the robot body. At this time, the above-mentioned functions can prevent a rapid dynamic characteristics change and reduce a movement error which may be caused by a difference between an actual model and a dynamic equation modeling variable.

The state of the robot is periodically changed between the single-leg-support state and the double-leg-support state when the robot is walking. Here, when the robot takes a step on the ground and enters the single-leg-support state, a comparatively large external force is momentarily applied to the robot. The imaginary rotary suspensions which are provided on, e.g., three pitching axes can function to block a large impulse which is momentarily applied to the robot, thus absorbing shock. Restoring force, by which the suspensions are returned to their original states, assists the wearer in returning to his/her initial posture, thus reducing energy consumption of the wearer.

Although preferred embodiments of the present disclosure have been disclosed for illustrative purposes, those skilled in the art will appreciate that various modifications, additions and substitutions are possible, without departing from the scope and spirit of the accompanying claims.

What is claimed is:

1. A method for controlling gait of a robot, comprising:
    forming an imaginary wall at a position spaced apart and outward from feet of the robot when the robot is in a double-leg-support state;
    kinetically calculating a variation in a distance between a body of the robot and the imaginary wall and a variation in a speed of the body of the robot relative to the imaginary wall using an angle of a joint and a length of a link of the robot;
    applying the variation in the distance and the variation in the speed to an imaginary spring-damper model formed between the body of the robot and the imaginary wall, and calculating an imaginary reaction force required by the body of the robot; and
    converting the calculated reaction force into a drive torque required by the body of the robot using a Jacobian transposed matrix.

2. The method as set forth in claim 1, wherein the imaginary wall comprises imaginary walls respectively formed on opposite sides of the robot, and ahead of and behind the robot.

3. The method as set forth in claim 1, wherein the robot comprises an ankle joint, a knee joint and a hip joint.

4. The method as set forth in claim 1, wherein converting the calculated reaction force includes, when the robot is in a single-leg-support state, kinetically calculating a variation in a height between a hip of the robot and a sole of one of the feet of the leg that is supporting the body, and kinetically calculating a variation in a speed of the hip relative to the sole using an angle of the joint and the length of the link of the robot.

5. The method as set forth in claim 4, wherein kinetically calculating the variation in the height includes applying the variation in the height and the variation in the speed of the hip to an imaginary spring-damper model that is present between the hip and the sole, and calculating an imaginary support force required by the leg that is supporting the body of the robot.

6. The method as set forth in claim 5, wherein calculating the imaginary support force includes converting the calculated support force into a drive torque required by the joint of the robot using a Jacobian transposed matrix.

7. The method as set forth in claim 1, wherein the robot comprises a pitching joint provided in a hip of the robot, and converting the calculated reaction force includes applying a variation in an angle of the pitching joint and a variation in an angular speed of the pitching joint to an imaginary spring-damper model that is present between two links that are connected to each other by the pitching joint, and calculating a pitching torque required by the pitching joint.

8. The method as set forth in claim 1, wherein the robot comprises a rolling joint provided in a hip of the robot, and converting the calculated reaction force includes applying a variation in an angle of the rolling joint and a variation in an angular speed of the rolling joint to an imaginary spring-damper model that is present between two links that are connected to each other by the rolling joint, and calculating a rolling torque required by the rolling joint.

* * * * *